US006266809B1

(12) United States Patent
Craig et al.

(10) Patent No.: US 6,266,809 B1
(45) Date of Patent: *Jul. 24, 2001

(54) METHODS, SYSTEMS AND COMPUTER PROGRAM PRODUCTS FOR SECURE FIRMWARE UPDATES

(75) Inventors: Jeffrey A. Craig, Chapel Hill; John L. Harter; Robert A. Johnson, both of Cary; Brian Stuart Lauber, Raleigh, all of NC (US); James M. Stafford, Austin, TX (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/912,288

(22) Filed: Aug. 15, 1997

(51) Int. Cl.[7] ................................................ G06F 9/445
(52) U.S. Cl. ................................ 717/11; 717/9; 717/10
(58) Field of Search ....................................... 717/10, 11, 9

(56) References Cited

U.S. PATENT DOCUMENTS 5,452,454 * 9/1995 Basu ...................................... 395/701
5,623,604 * 4/1997 Russell et al. ..................... 395/200.1
5,870,610 * 2/1999 Beyda ................................... 395/712

OTHER PUBLICATIONS

*Profile Definition: Network Computer*, X/Open Document No.:X975, pp. 1–9 ( The Open Group, Berkshire, UK 1997).
Symborski, "Updating Software And Configuration Data In A Distributed Communications Network", Hughes Network System, Inc., IEEE, pp. 331–338, Apr. 1988.*

* cited by examiner

*Primary Examiner*—Mark Powell
*Assistant Examiner*—Ted T. Vo
(74) *Attorney, Agent, or Firm*—Myers Bigel Sibley & Sajovec; Jeanine S. Ray-Yarletts

(57) ABSTRACT

Methods, systems and computer program products are provided which update firmware in a network computer by replacing the standard operating system to be loaded at the initialization of the network computer with a firmware update operating system. The firmware update operating system is then downloaded to the network computer and initiated to update the firmware of the network computer. The firmware update operating system may then be replaced with the standard operating system to be loaded at the initialization of the network computer. The network computer may then be reinitialized by, for example, a cold boot, so as to load the standard operating system. The cold boot may be server initiated so as to allow for firmware updates with intervention by an operator at the network computer.

28 Claims, 5 Drawing Sheets

# METHODS, SYSTEMS AND COMPUTER PROGRAM PRODUCTS FOR SECURE FIRMWARE UPDATES

FIELD OF THE INVENTION

This invention relates to computer systems, methods and program products, and more particularly to personal computer and network computer systems, methods and program products.

BACKGROUND OF THE INVENTION

Personal computers are widely used in consumer and commercial environments. Personal computers include, but are not limited to, IBM® and IBM-compatible computers which operate in a Windows® or OS/2® environment. Personal computers can also include workstations operating in a Unix® or other environment. As is well known to those having skill in the art, a personal computer includes a central processing unit (also referred to as a "system unit") and a user interface that is responsive to user input and to the central processing unit. The user interface generally includes a display, a keyboard, and a pointing device such as a mouse. The personal computer also includes persistent storage such as a hard disk drive that stores programs and data. An operating system such as Windows 95®, OS/2® or Unix® is also stored in the persistent storage. A plurality of applications programs such as computer games or an office suite are also generally stored in the persistent storage.

Personal computers also may include a network interface application that communicates with a server over a network. The network interface application may be an Internet interface that communicates with the Internet using HTTP or other protocols. Examples of network interface applications include Netscape® Navigator® and Microsoft® Internet Explorer®.

As personal computers and their application programs become more sophisticated, it is becoming increasingly clear that their total cost of ownership, including hardware and software maintenance and upgrades, may be much larger than the initial cost of the hardware and software itself. In fact, up to $35,000 or more may be spent annually to maintain each personal computer in a corporate environment.

Network computers have been proposed in order to reduce this overall cost of ownership. Network computers generally do not require a user or administrator to install software on the computer. Rather, all software is loaded from a network server when the network computer is started or when needed during a session. The overall specifications for network computers are described in a document entitled *Profile Definition: Network Computer, X/Open*, Document Number: X975, published by The Open Group, Berkshire, UK (1997), the disclosure of which is hereby incorporated herein by reference. Network computers have presently been announced and/or shipped by IBM Corp. (Network Station, Series 100, 300 and 1000), Sun Microsystems (Java Station), Oracle (N.C.), Neoware (Neostation), Wyse (Winterm), Acorn (Netstation) and Corel Computer Corp. (Corel Video Network Computer).

Programs for network computers are typically written in Java. As is well known to those having skill in the art, Java programs, in compiled form, are generally portable and will generally run on a wide range of computers and operating systems. Java programs support referencing Universal Resource Locator (URL) identifiers with content types of audio/basic, audio/x-wav, image/gif and image/jpeg. Java provides a machine dependent desktop for executing machine independent applets.

Network computers are also known as "diskless computers" because they generally do not include persistent storage such as a floppy disk, hard disk or CD-ROM. Due to the lack of a disk, all programs and data, except for a small loading program, are obtained from the server.

FIG. 1 is a simplified block diagram of a network computer that is connected to a server using an Internet connection. As shown in FIG. 1, network computer 100 includes a central processing unit 102 (also referred to as a "system unit") and a user interface including a display 104, a keyboard 106, and a pointing device (mouse) 108. As also shown in FIG. 1, the network computer does not generally include persistent storage for storing programs and data. A limited amount of volatile storage such as Random Access Memory (RAM) may be used to temporarily store applications and data while the network computer is running, but this volatile storage loses its information when the network computer is turned off. The network computer may also include permanent storage such as Read Only Memory, which may store a URL identifier to identify the server with which the computer works. The permanent storage may also include a base key which is used for security purposes.

Network computer 100 also includes a network interface 110 that allows the computer to communicate with a server 120 using a network such as the Internet 130. As shown in FIG. 1, server 120 generally includes Hypertext Transfer Protocol (HTTP), Bootstrap Protocol (BOOTP), Dynamic Host Configuration Protocol (DHCP), Network File System (NFS) and Trivial File Transfer Protocol (TFTP) servers. The server 120 also stores operating system images and a Java Runtime Environment (JRE). A Java desktop and other applications may also be included. Other non-Java related applications may also be included.

During initialization, the network computer typically carries out a process similar to that of a personal computer. The network computer begins by performing a power on self test (POST) followed by execution of program code which loads the operating system from the network server. The operating system is then initialized and any further processing is performed utilizing the operating system (e.g. loading of the JRE). The program code which resides on the network computer is often referred to as "firmware" because it is persistently stored in the computer hardware.

In order to load the operating system, the program code which resides on the network computer should be able to initialize the network interface and other peripherals associated with the network computer. Thus, the firmware may have device dependent program code and may be required to change over time. Furthermore, as peripherals are added to the network computer there may be a need to revise the firmware to account for these peripherals. Additionally, the initialization code or the POST procedure may also need to change from that originally provided with the network computer.

Traditionally, firmware and device drivers which reside on a personal computer are updated by installing new firmware or device drivers from a portable storage media such as a floppy disk drive, CDROM, or hard disk. Alternatively, the update would be downloaded from a commonly accessible storage location such as a bulletin board or Internet web site to a persistent local storage device. This process, essentially replicates the typical process of updating the firmware from a portable storage media by providing the firmware update on persistent storage. In either case, the firmware installation requires a persistent local storage media because the update would be accomplished by initializing the personal computer (i.e. "booting") from the persistent local storage media. This operation is typically a manual operation which may require user intervention at each personal computer to be updated.

By providing for centralized application management at the server, network computers may reduce the management requirements for a computer network. Furthermore, because the applications of a network computer are centrally managed, a user may move from location to location within the network and still have available the same applications. However, because a network computer has no removable or local mass storage such as hard disk, CDROM or floppy disk drives, updating firmware or device drivers which reside on the network computer may be difficult, labor intensive and in some situations impossible. Furthermore, there is no local storage device to download the update to or to boot from to install the new firmware. Additionally, the download operation may be non-secure and may introduce the possibility that a virus or other corrupted data may be introduced to the computer. Accordingly, a need exists for improvements in updating firmware for network computers.

SUMMARY OF THE INVENTION

It is one object of the present invention to provide for updating the firmware of a network computer without the need for a floppy drive or other portable storage media.

Another object of the present invention is to provide for more secure updates of a network computer's firmware.

Still another object of the present invention is to provide for updating a network computer's firmware without intervention by the user of the network computer.

Yet another object of the present invention is to provide for centralized management of the firmware of network computers.

These and other objects of the present invention are provided by methods, systems and computer program products which update firmware in a network computer by replacing, at the server, the standard operating system to be loaded at the initialization of the network computer with a firmware update operating system. The firmware update operating system is then downloaded to the network computer and initiated to update the firmware of the network computer. The firmware update operating system may then be replaced at the server with the standard operating system to be loaded at the initialization of the network computer. The network computer may then be reinitialized, by for example, a cold boot, so as to load the standard operating system.

By downloading to the network computer an operating system which updates the network computer's firmware, the firmware may be updated without the need for portable storage media. Furthermore, because the update operating system may be downloaded from a common network server, the firmware of multiple network computers may be centrally managed. Also, because the update operating system is downloaded from a single source the security which may be utilized with the update operating system may be enhanced.

In further embodiment of the present invention, the update operating system is a boot image of the firmware update which is downloaded to the network computer. Furthermore, the standard operating system may also be a boot image of the standard operating system. Also, after downloading, the firmware update operating system may be validated prior to the initiating the firmware update. Similarly, the standard operating system may be validated before being utilized to initialize the operating system.

By providing for validation of the operating systems at the network computer, the security of the firmware update may be further increased. The boot image of the firmware update may be confirmed by the network computer so that viruses or other data corruption may be avoided at the network computer.

In another embodiment of the present invention, whether the network computer firmware is to be updated is determined and the update of the firmware conditioned upon this determination. The determination of the need to update the firmware of a network computer may be carried out by a Simple Network Management Protocol (SNMP) query to an SNMP agent resident on the network computer. The ability to detect the need for an update by a server allows for the automation of the firmware update process and furthers the centralization of the update process.

Also, the firmware update operating system could also update the firmware of a device attached to the network computer. By performing a cold reboot of the network computer, which may be server initiated, an initialization of devices attached to the network computer, such as peripheral adapter cards, are also reinitialized. Thus, the present invention provides for, not only the update of firmware of a network computer, but for the update of firmware of devices accessible to the network computer.

As will be appreciated by those of skill in the art, the present invention may be embodied as systems, methods and/or computer program products.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices. Accordingly, the present invention may take the form of an entirely hardware embodiment, an entirely software embodiment or an embodiment combining software and hardware aspects.

The present invention is described herein with respect to flowchart illustrations of embodiments or aspects of the present invention. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

Figure 1:
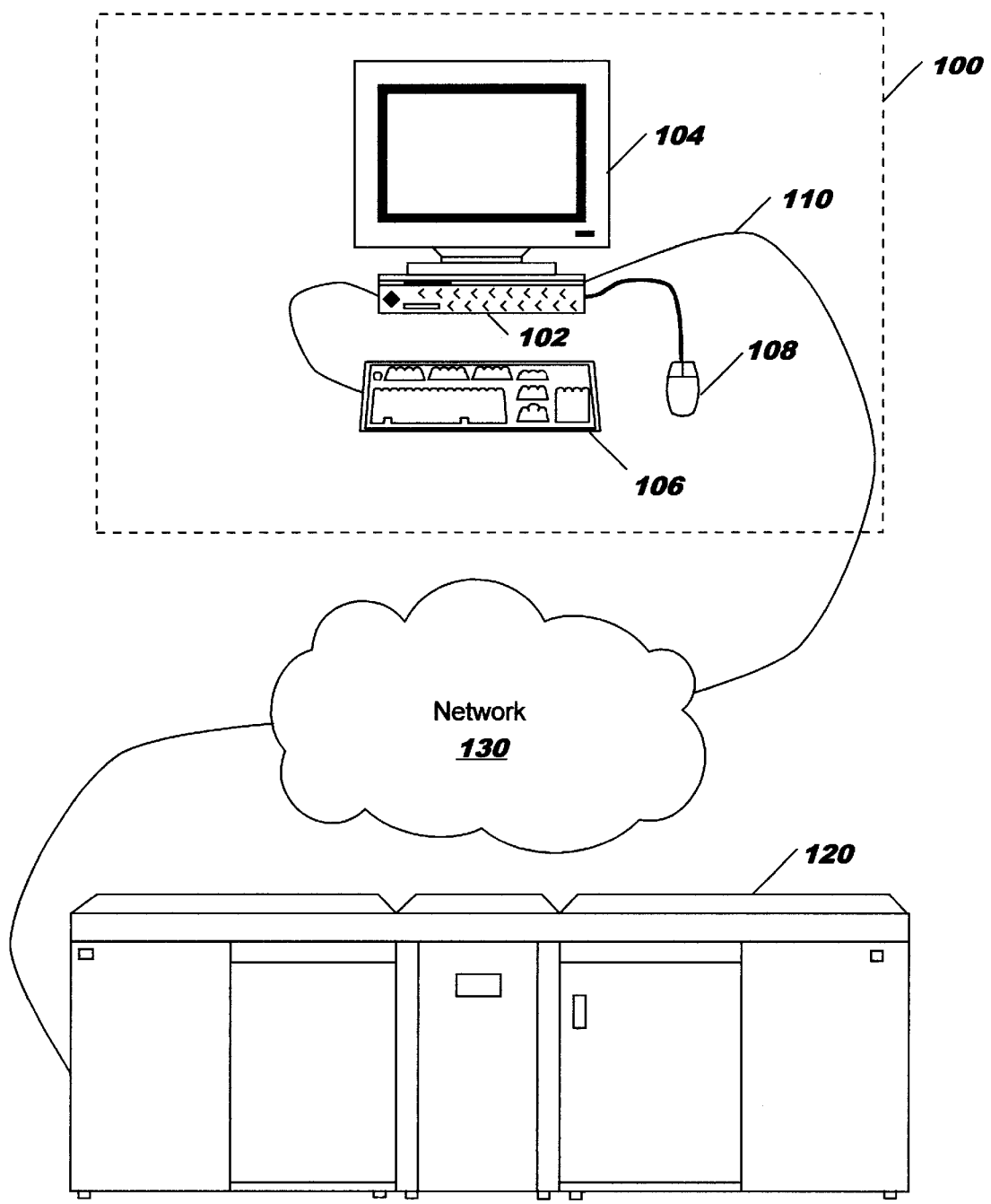
FIG. 1 is a simplified block diagram of a conventional network computer that communicates with a server over a network.
Figure 2:
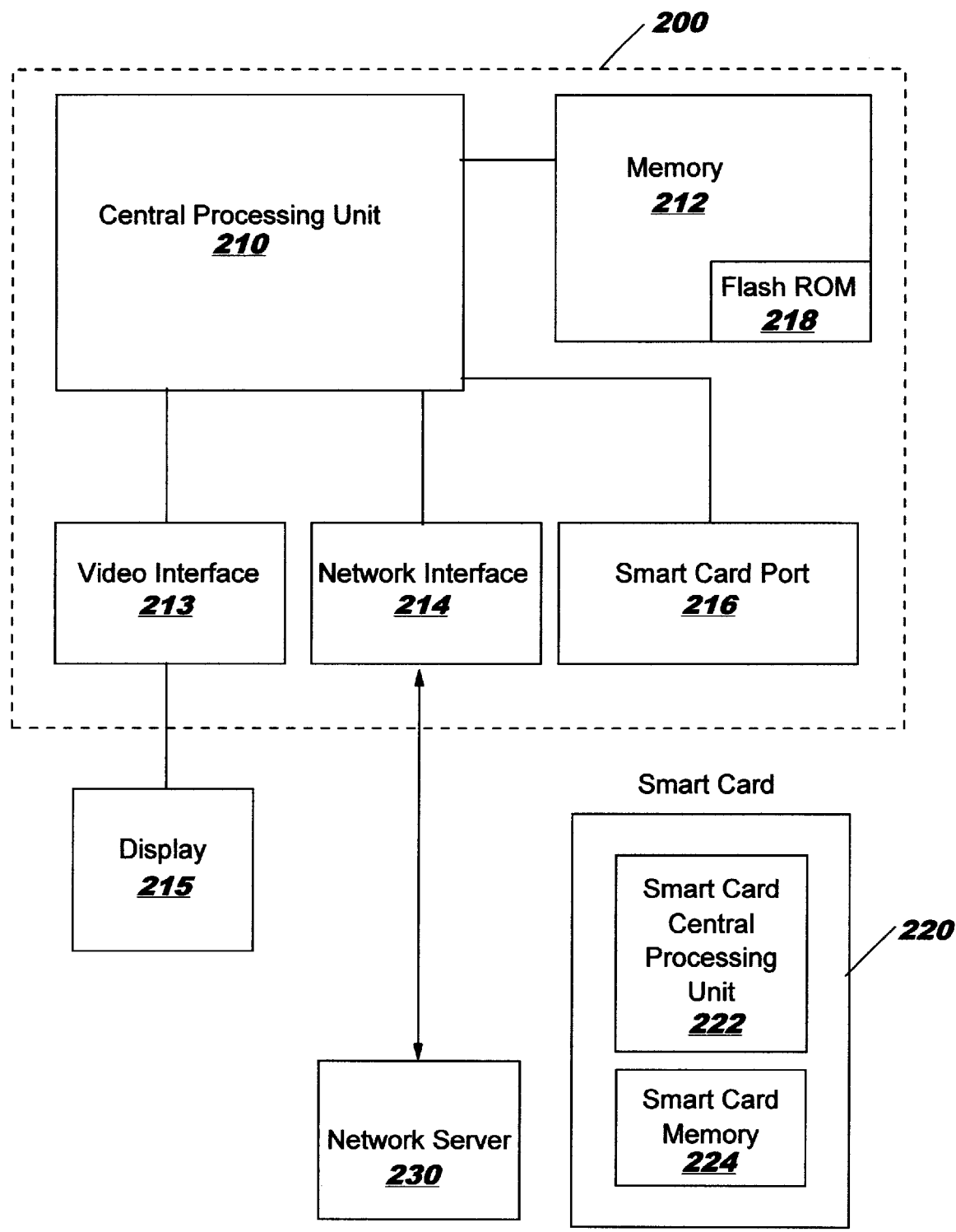
FIG. 2 is a block diagram of a network computer according to the present invention.

FIG. 2 illustrates one embodiment of a network computer according to the present invention. FIG. 2 illustrates the network computer system unit 200 and display 215 as well as a smart card 220. As seen in FIG. 2, a network computer system unit 200 may include a central processing unit (CPU) 210, memory 212 which includes flash ROM 218, a network interface 214 a smart card port 216, a video interface 213. The central processing unit 210 may be a microprocessor such as an Intel® Pentium® or other microprocessors. The memory may include random access memory (RAM), read only memory (ROM), electronically erasable programmable read only memory (EEPROM) or other types of memory known to those of skill in the art. Furthermore, the memory 212 may include cache such as an L2 cache, an instruction cache, a data cache or any combination thereof. However, according to the present invention, the memory 212 includes some form of persistent storage such as the flash ROM 218 for storing the firmware of the network computer.

The network computer may communicate through the network interface 214 with a network server 230. The network interface may be any number of network interfaces known to those of skill in the art, such as token ring or ethernet. Furthermore, the network communication protocol may be any communication protocol suitable for use with a network computer, such as, for example, TCP/IP.

As will be appreciated by those of skill in the art, additional features may be incorporated into the network computer 200, such as serial and/or parallel communication interfaces, video acceleration card, sound and other multimedia cards as well as multiple network interfaces. Furthermore, a network computer according to the present invention may include a personal computer emulating a network computer such as is disclosed in commonly assigned United States Patent Application entitled Network Computer Emulator Systems, Methods and Computer Program Products for Personal Computers, the disclosure of which is incorporated by reference as if set forth fully.

FIG. 2 also illustrates an access card 220 associated with the network computer of the present invention. The access card 220 may be a smart card in that a central processing unit 222 and memory 224 are provided on the access card 220. When the access card 220 is placed in the smart card port of the network computer, the network computer may communicate with the smart card central processing unit 222. The smart card may allow for secure information to be stored in the smart card memory 224 in an encrypted format that can only be accessed through the smart card central processing unit 222.

Briefly, in operation, the network computer can be rebooted remotely by a network management program such as the Simple Network Management Protocol (SNMP) manager. The initialization process of the network computer includes performing the POST operations of the network computer and then accessing a network server to download a boot image to the network computer. The boot image may be a firmware update boot image. The boot image is validated by the network computer, and the network computer then executes the program code of the boot image to update the firmware of the network computer. A command initiated cold reboot of the network computer is performed and a second boot image is downloaded to the network computer. The cold boot resets the network computer as well as resetting the onboard peripherals of the network computer such as the network interface. The second boot image contains the standard operating system for the network computer.

Figure 3:
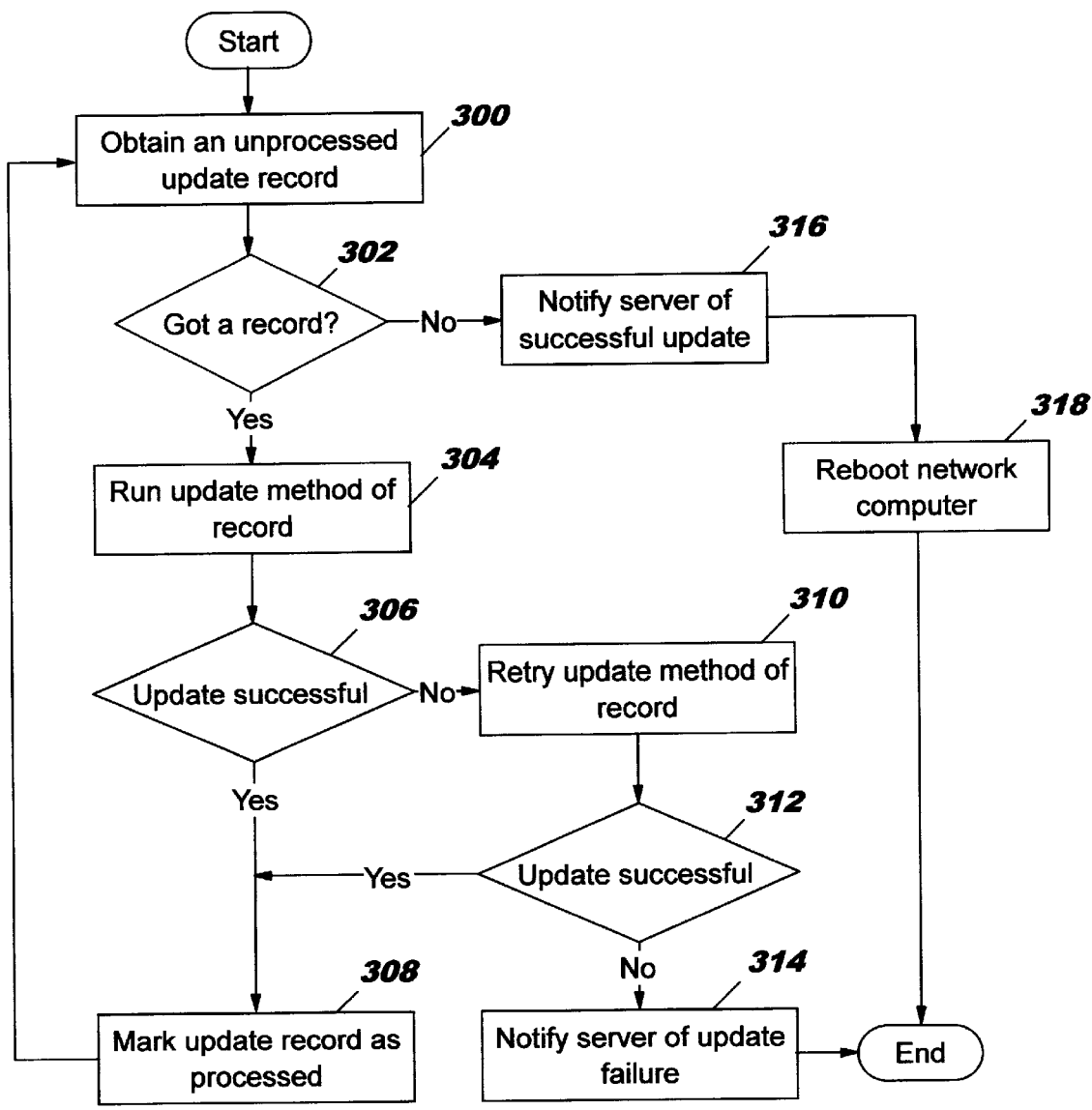
FIG. 3 is a flowchart illustration of operations of a network computer embodying the present invention.

The present invention will now be described with reference to FIG. 3, FIG. 4a and FIG. 4b, which are flow chart illustrations of the operation of a network server and a network computer according to the present invention. As seen in FIG. 3, after the network computer has downloaded the update boot image, the network computer attempts to obtain an unprocessed update record from the update boot image (block 300) downloaded to the network computer. The update boot image may contain firmware update images for the network computer as well as peripherals attached to the network computer. The firmware of each of these devices may be updated in a single process by including in the boot image multiple update images. These update images may be incorporated as independent records in the boot image. A record may contain information on how to process the update image to achieve the update of the firmware as well as the update image itself. Through the use of the information and the update image of a record, the firmware for the network computer or a particular device connected to the network computer may be updated. Furthermore, a list of update records may also be downloaded to the network computer so that the network computer may keep track of the records processed and the remaining records to process.

After attempting to obtain an unprocessed update record from the download, the network computer determines if an unprocessed record was obtained (block 302). If an unprocessed record was obtained the information contained in the record and the update image are utilized to update the firmware of the device (block 304). The network computer then determines if the update was successful (block 306). If the update was successful, then the update record is marked as processed (block 308) and the network computer attempts to obtain another unprocessed update record (block 300).

If the update was not successful, then the network computer retries the update (block 310) and again test for success (block 312). If the update still fails, then the network computer notifies the server of the failure (block 314) and ends the update process. While the present invention is described with respect to FIG. 3 as performing a single retry, as will be appreciated by those of skill in the art, any number of retries may be attempted.

If the network computer attempts to obtain an unprocessed record (block 300) and no record is obtained (block 302), then the update was successful as all records in the update download were successfully processed. The network computer notifies the network server of the successful update (block 316) and then reboots to download the standard operating system (block 318) to complete the update process.

Figure 4A:
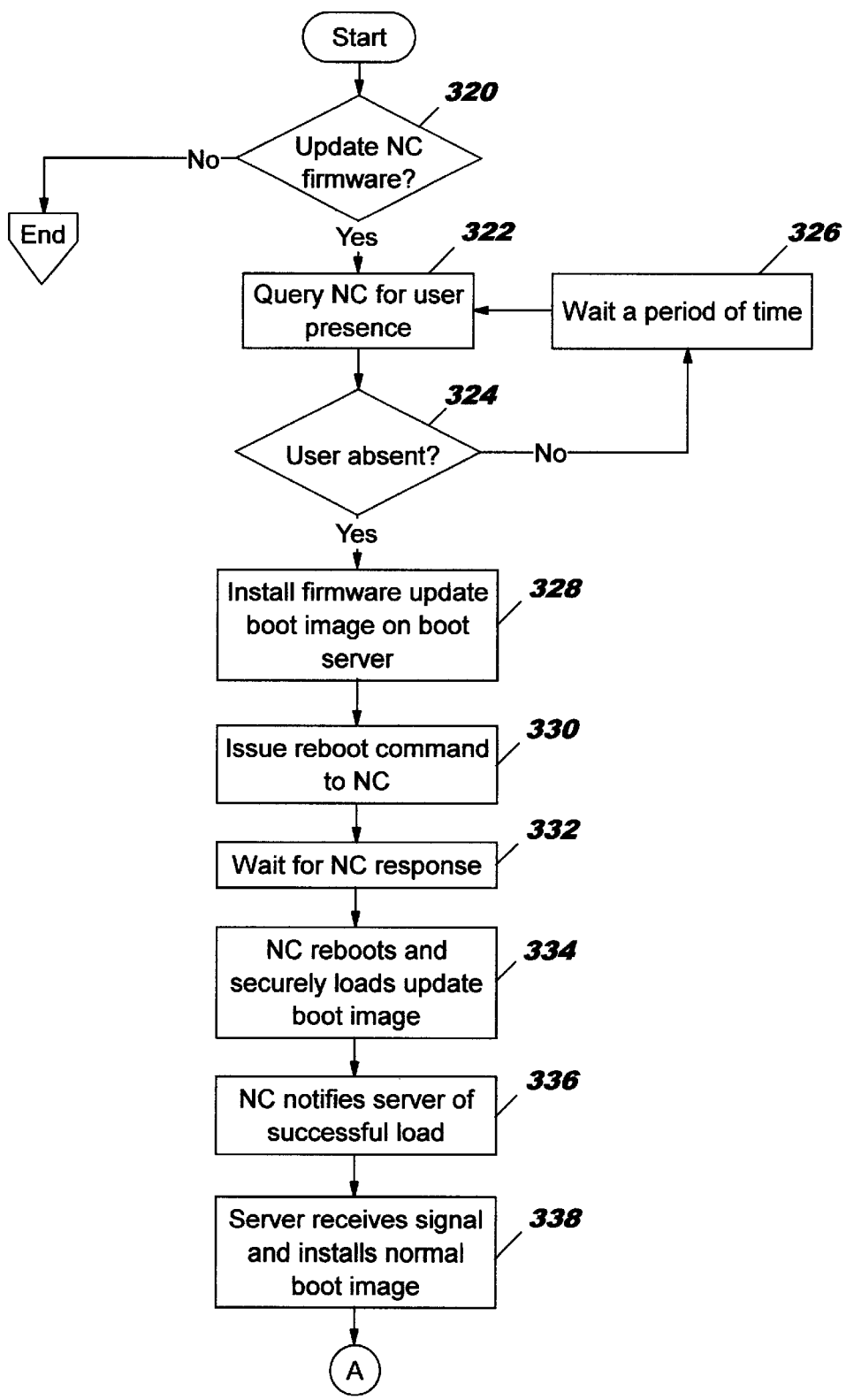
FIGS. 4a and 4b are a flowchart illustration of operations of network computer systems, methods and computer program products according to the present invention.
Figure 4B:
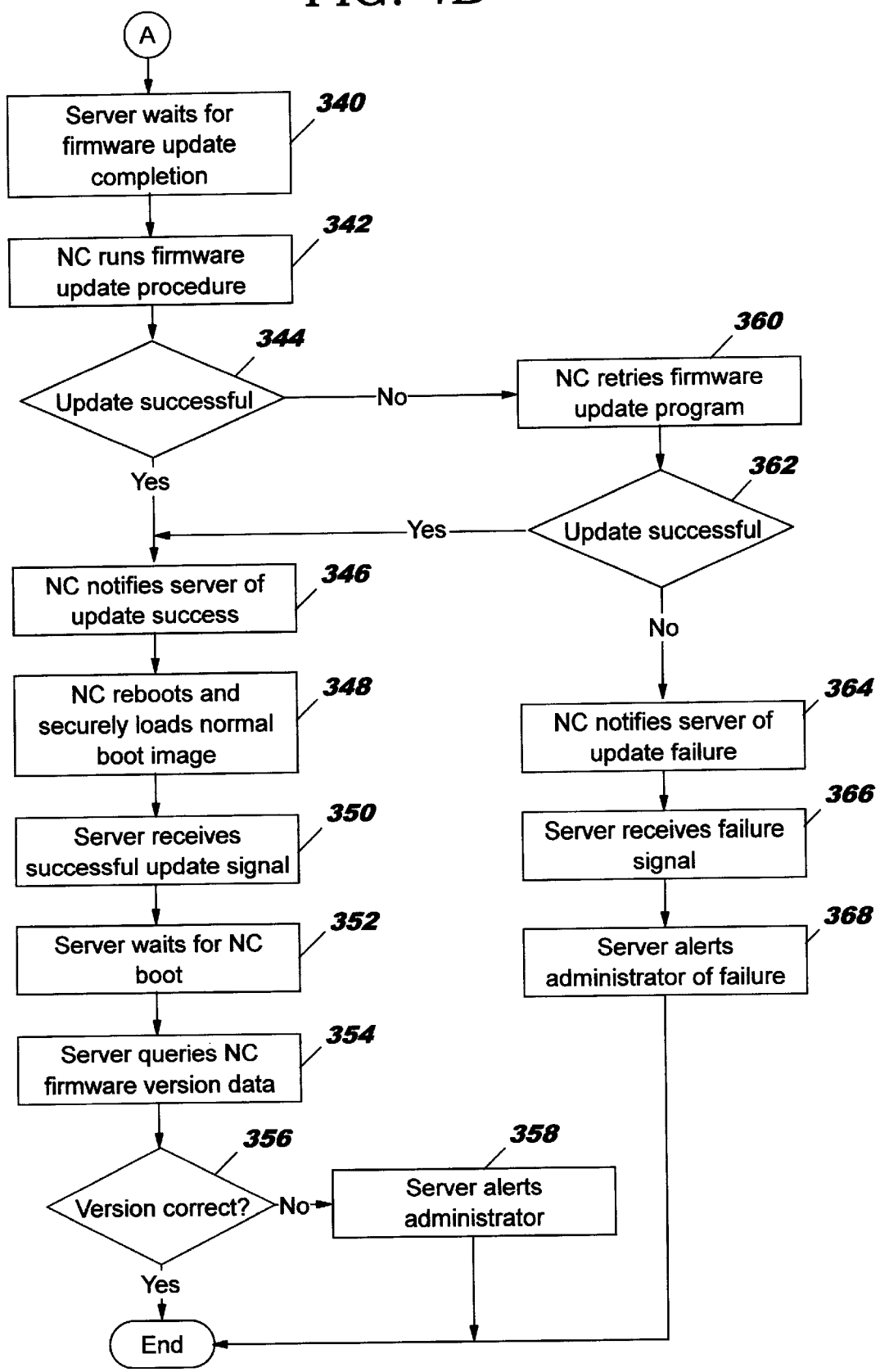

FIGS. 4a and 4b describe the update process including both server and network computer operations. As seen in FIG. 4a, the update process begins by the server determining if the network computer (NC) requires a firmware update (block 320). This determination may be made by obtaining the firmware date or revision code for the network computer. The firmware date or revision code may be obtained in a network utilizing the SNMP by the SNMP manager querying the SNMP agent resident at the network computer. Alternatively, if all network computers accessing a server are to be updated, then the server could keep track of the network computers which have been updated and update a network computer at start up if the network computer has not been updated.

If the network computer is to have its firmware updated, then the server determines if the network computer currently has a user (block 322) and if the user is not absent (block 324) waits a period of time for the user to complete using the network computer (block 326). Eventually, the user is no longer using the network computer and the network server installs the update boot image on the boot server for access by the network computer (block 328). The network server then issues a cold reboot command utilizing SNMP to the network computer (block 330). The network server then waits until the update boot image is downloaded by the network computer (block 334). Upon receiving the reboot command from the network server, the network computer reboots which causes the network computer to download the update boot image (block 334). As will be appreciated by one of skill in the are, existing program code for obtaining boot images as part of the initialization of a network computer may be utilized to download a boot image. After downloading the update boot image, the network computer validates the boot image to assure that the boot image has not been tampered with and is intended for the network computer. The validation of the update boot image may be carried out in the same manner as presently utilized to validate boot images of operating systems in network computers. Furthermore, any number of encryption and/or compression methods may be utilized so as to increase security of the transferred boot image and/or reduce the amount of data required to be transmitted to download the boot image.

If the boot image is valid, then the network computer notifies the network server that the download was successful (block 336). When the server receives the signal from the network computer that the update boot image download was successful, the server installs the normal boot image on the boot server (block 338).

Continuing on to FIG. 4b (as indicated by the connector "A" in FIG. 4a and the connector "A" in FIG. 4b), the server then waits for the firmware update to complete at the network computer. The operations of the firmware update at the network computer are described in detail with respect to FIG. 3 but, for the sake of clarity certain portions are also illustrated in FIG. 4b. As seen in FIG. 4b, the network computer carries out the firmware update procedure (block 342) and determines if the procedure was successful (block 344). If the procedure was successful, then the network computer notifies the server of the success of the update (block 346), reboots and securely loads the normal operating system boot image (block 348). The server then receives the successful update signal from the network computer (block 350) and waits for the network computer reboot (block 352). The server then queries the network computer to determine the firmware version data such as with a SNMP query (block 354) and checks to see if the version is correct (block 356). If the version is correct the update process is complete, if the version is not correct, then the update failed for some reason and the server alerts a network administrator (block 358).

Returning to block 344, if the network computer determines that the first attempt of the update was not successful, then the network computer retries the firmware update (block 360) and if that is successful (block 362) continues with the procedure described above. However, if the second attempt is also not successful, then the network computer notifies the server of the update failure (block 364). When the server receives the failure signal from the network computer (block 366), the server alerts the network administrator of the failure (block 368) and the update process ends.

The present invention has been described with respect to a single network computer being updated by a single network server, however, as will be appreciated by those of skill in the art, the present invention is equally applicable to numerous network computers being remotely updated by a centralized network administrator. The use of the remote cold reboot process further allows for multiple network computers and the peripherals attached to those computers to be updated without intervention at each individual network computer.

As used herein, the term network computer refers to any data processing system which boots from a network server.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method of updating firmware in a network computer, which initializes using a boot image comprising a standard operating system on a network server, the method comprising:

detecting, at the network server, whether the network computer firmware is to be updated;

performing the following steps if the network server detects that the network computer firmware is to be updated:

replacing, at the network server, the standard operating system to be loaded at the initialization of the network computer with a firmware update operating system; then downloading the firmware update operating system to the network computer at initialization of the network computer; then initiating the firmware update operating system to update the firmware of the network computer.

2. A method according to claim 1, further comprising the step of replacing, at the network server, the firmware update operating system with the standard operating system to be loaded at the initialization of the network computer.

3. A method according to claim 2, wherein said step of replacing the firmware update operating system comprises the step of reinitializing the network computer so as to load the standard operating system.

4. A method according to claim 2, wherein said step of replacing, at the network server, the standard operating system to be loaded at the initialization of the network computer with a firmware update operating system comprises the step of replacing the boot image for the standard operating system with a firmware update boot image, and wherein said step of replacing the firmware update operating system with the standard operating system comprises the step of replacing the firmware update boot image with the standard operating system boot image.

5. A method according to claim 1, further comprising the step of validating the firmware update operating system prior to the step of initiating the firmware update operating system.

6. A method according to claim 1, wherein said step of replacing, at the network server, the standard operating system to be loaded at the initialization of the network computer with a firmware update operating system comprises the step of replacing, at the network server, the boot image for the standard operating system with a firmware update boot image.

7. A method according to claim 1, wherein said firmware update operating system updates the firmware of a device attached to the network computer.

8. A method according to claim 1, wherein said detecting step comprises the step of sending an SNMP query to an SNMP agent resident on the network computer.

9. A method according to claim 1, wherein the firmware update operating system causes the update of a plurality of devices.

10. A method according to claim 1, wherein said step of reinitializing the network computer comprises the step of initiating a cold reboot of the network computer.

11. A system for updating firmware in a network computer, which initializes using a boot image comprising a standard operating system on a network server, comprising:
    means for detecting, at the network server, whether the network computer firmware is to be updated;
    means for replacing the standard operating system to be loaded at the initialization of the network computer with a firmware update operating system;
    means for downloading the firmware update operating system to the network computer at initialization of the network computer; and
    means for initiating the firmware update operating system to update the firmware of the network computer;
    wherein the means for replacing the standard operating system, the means for downloading the firmware update operating system, and the means for initiating the firmware update operating system are operably associated with the means for detecting so as to only update the network computer firmware if the means for detecting detects that the network computer firmware is to be updated.

12. A system according to claim 11, further comprising means for replacing the firmware update operating system with the standard operating system to be loaded at the initialization of the network computer.

13. A system according to claim 12, wherein said means for replacing the firmware update operating system comprises means for reinitializing the network computer so as to load the standard operating system.

14. A system according to claim 12, wherein said means for replacing the standard operating system to be loaded at the initialization of the network computer with a firmware update operating system comprises means for replacing the boot image for the standard operating system with a firmware update boot image, and wherein said means for replacing the firmware update operating system with the standard operating system comprises means for replacing the firmware update boot image with the standard operating system boot image.

15. A system according to claim 11, further comprising means for validating the firmware update operating system prior to the initiating of the firmware update operating system.

16. A system according to claim 11, wherein said means for replacing the standard operating system to be loaded at the initialization of the network computer with a firmware update operating system comprises means for replacing the boot image for the standard operating system with a firmware update boot image.

17. A system according to claim 11, wherein said firmware update operating system updates the firmware of a device attached to the network computer.

18. A system according to claim 11, wherein the firmware update operating system causes the update of a plurality of devices.

19. A system according to claim 11, wherein said means for reinitializing the network computer comprises means for initiating a cold reboot of the network computer.

20. A computer program product for updating firmware in a network computer, which initializes using a boot image comprising a standard operating system on a network server, the computer program product comprising:
    a computer-readable storage medium having computer-readable program code means embodied in said medium, said computer-readable program code means comprising:
    computer-readable program code means for detecting, at the network server, whether the network computer firmware is to be updated,
    computer-readable program code means for replacing the standard operating system to be loaded at the initialization of the network computer with a firmware update operating system;
    computer-readable program code means for downloading the firmware update operating system to the network computer at initialization of the network computer; and
    computer-readable program code means for initiating the firmware update operating system to update the firmware of the network computer;
    wherein the computer-readable program code means for replacing the standard operating system, the computer-readable program code means for downloading the firmware update operating system, and the computer-readable program code means for initiating the firmware update operating system are operably associated with the computer-readable program code means for detecting so as to only update the network computer firmware if the computer-readable program code means for detecting detects that the network computer firmware is to be updated.

21. A computer program product according to claim 20, further comprising computer-readable program code means for replacing the firmware update operating system with the standard operating system to be loaded at the initialization of the network computer.

22. A computer program product according to claim 21, wherein said computer-readable program code means for replacing the firmware update operating system comprises computer-readable program code means for reinitializing the network computer so as to load the standard operating system.

23. A computer program product according to claim 21, wherein said computer-readable program code means for replacing the standard operating system to be loaded at the initialization of the network computer with a firmware update operating system comprises computer-readable program code means for replacing the boot image for the standard operating system with a firmware update boot image, and wherein said computer-readable program code means for replacing the firmware update operating system with the standard operating system comprises computer-readable program code means for replacing the firmware update boot image with the standard operating system boot image.

24. A computer program product according to claim 20, further comprising computer-readable program code means for validating the firmware update operating system prior to the initiating of the firmware update operating system.

25. A computer program product according to claim 20, wherein said computer-readable program code means for replacing the standard operating system to be loaded at the initialization of the network computer with a firmware update operating system comprises computer-readable program code means for replacing the boot image for the standard operating system with a firmware update boot image.

26. A computer program product according to claim 20, wherein said firmware update operating system updates the firmware of a device attached to the network computer.

27. A computer program product according to claim 20, wherein said computer-readable program code means for reinitializing the network computer comprises computer-readable program code means for initiating a cold reboot of the network computer.

28. A computer program product according to claim 20, wherein the firmware update operating system causes the update of a plurality of devices.

* * * * *